March 11, 1952 — A. L. JOHNSON — 2,588,531
ELECTRIC SOLDERING IRON
Filed April 26, 1948

INVENTOR.
Arthur L. Johnson,
BY George D. Richards
Attorney

UNITED STATES PATENT OFFICE 2,588,531

ELECTRIC SOLDERING IRON

Arthur L. Johnson, Roselle Park, N. J.

Application April 26, 1948, Serial No. 23,332

2 Claims. (Cl. 219—26)

This invention relates, in general, to soldering irons and has particular reference to electrical implements of this class.

To be more explicit, the invention is confined to improvements in heating elements and tips of electric soldering irons.

It has almost invariably been the practice to construct soldering iron tips of pure copper because of its high heat conductivity and comparatively low cost. However, copper oxidizes rapidly when heated and this tendency has proved most troublesome to users of soldering irons. Surface oxidation is objectionable enough, because it impedes conduction of heat between the heat-storing mass of the tip and the soldered joint, but it has been found that oxidation does not stop at the surface. On the contrary, it progressively penetrates deeper and deeper into the copper mass until eventually the heat conducting quality of the entire tip has been reduced to a point where any heat which may have been absorbed from the generative source is virtually imprisoned. Such deterioration renders a tip unserviceable for further use. Efforts to retard oxidation, such as persistent cleaning, dressing, rubbing with oxidation-preventing substances, and tinning before each soldering operation, have met with only limited success. Slight prolongation of the useful life of tips in this laborious manner has been offset by the rapid attrition of the metallic mass. The consequent reduction in cross-section is particularly serious in the case of small size tips.

It is therefore my primary object to render soldering iron tips of all current types more durable by improving their composition in a way that will inhibit oxidation of the copper body.

A closely related further object is to so increase the life expectancy of a copper body which is to be subjected to the high temperatures incident to soldering operations that it now becomes practicable to construct the tip and heating element of an electric soldering iron in the form of a permanent assembly possessing advantages which will now be revealed.

Due to the fact that, in the past, the untimely copper break-down of soldering iron tips has resulted in great disparity between the length of life of such a tip and the heating element with which it may be associated, it has been the usual practice to make the tips separable from the heating elements. Generally, the resistance coil of the element has been wound directly upon a permanently associated core of suitable metal, such as copper or bronze. Then, the tip has been coupled with the core in a detachable manner. A common method has been to provide a screw-threaded connection between the tip and one end of the core. Another has been to effect a telescopic union of greater contact area, which has generally been done by providing the core with a central socket for reception of the elongated shank of the tip. However, the use of separate, replaceable tips has its practical disadvantages.

In the first place, any joint between two heat-conducting bodies reduces transfer of heat from one to the other, this being particularly true when the contiguous surfaces are subject to oxidation. Secondly, oxidation promoted by the high temperatures of use is almost certain to cause freezing of the joint. Such a condition will be aggravated in the case of a telescopic joint, rendering detachment of the tip usually impossible without damage to the heating element.

By increasing the life expectancy of tips to an age comparable to that of the average heating element, the manufacture of a one-piece tip and core structure has been made practicable. Because of this accomplishment and the coincidental inhibition of oxidation on those surfaces of the core which are contiguous to the heating element's resistance coil, a still further object of the invention has been realized. That object has been to achieve a better heat balance between tip and heating element. In other words, the heat transmission from the heating element to the tip will have become so efficient that the tip may be maintained at working temperatures within the normal range by generation in the heating element of a lower degree of heat than heretofore would have been the minimum requirement. Actually, it has been demonstrated in use of the improved, one-piece structure that the heating element wattage requirement has been reduced by as much as thirty-five percent. This represents a very substantial lowering of operational cost. Furthermore, it has been found that element burn-outs have been minimized by such marked reduction in element-impairing heat, and danger of dielectric leaks through the metallic housing has been reduced. For example, if the increased heat transmission efficiency within the heatable instrumentality permits the generation of 1200° F. in the heating element instead of 1500° F., the occurence of dielectric leaks will be proportionately less. This is important because such leaks subject the user to the hazard of electric shocks and also result in shortening the life of the electric insulation.

Another object is the provision of a permanently tinned tip for soldering irons of all types, which is self-maintained in such functionally perfect and clean condition that it is like a brand new copper tip throughout its now greatly prolonged span of life.

Other objects and advantages will become apparent from the following specific description when read in connection with the accompanying drawings, wherein several concrete embodiments of the inventive concept are disclosed.

In the drawings.

Throughout the drawings, like reference characters are employed to designate corresponding parts in the several figures, a slight variation being the use of appropriate chemical symbols for the respective metallic platings.

Before proceeding further with the description of my invention, it is desired to define certain generic terms which will be used hereinafter in the specification and claims. "Heating element," or "element," means the organization of resistance coil and protective insulation which constitutes the generative source of heat for the soldering tip. On the other hand, the term "heatable instrumentality" is intended to refer to any metallic part of a soldering iron which receives heat from the "heating element" and transmits such heat to the tip surface that performs the soldering operation. This latter term therefore embraces a separate tip of plug, screw, or any other type; a core alone, or any combination of tip and core, whether one-piece or multi-piece.

Inasmuch as the present invention is confined to the heating elements and heatable instrumentalities of electric soldering irons, the handle and stem portions of the complete implement with contained electrical leads, insulation, etc., have been omitted from the disclosure as being extraneous in that those elements may take any desired structural form without in any way affecting the present invention. For instance, my prior U. S. Patent No. 2,096,809, dated October 26, 1937, covers an electric soldering iron adapted to take the heating element and heatable instrumentality disclosed in Fig. 1 of the accompanying drawings and which includes the complete electrical conduction means for an operative device, but some holding and current supplying development of the future might be preferred.

Figure 1:
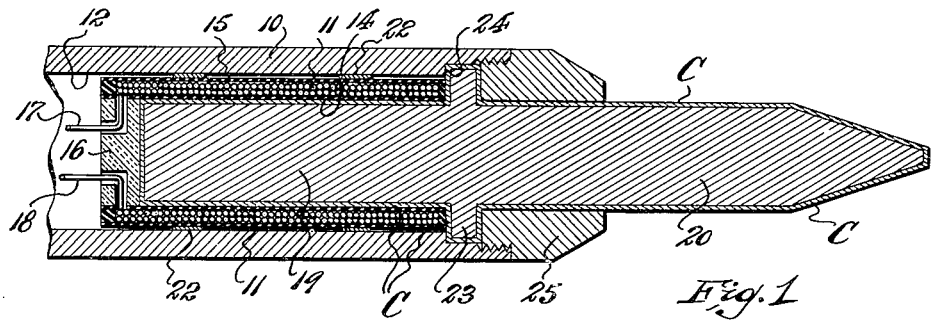
Fig. 1 is a longitudinal sectional view of the tip end portion of an electric soldering iron having my improved unitary heating element installed in the housing.

Referring now to Fig. 1, the numeral 10 designates the housing for the heating element 11, which fits snugly within the cylindrical bore 12 of the former but may be withdrawn endwise when replacement becomes necessary. Element 11 includes a resistance coil of suitable metal, such as chromium nickel, which is insulated electrically both inside and out by suitable means, such as the sheet mica shells 14 and 15, respectively. The inner end of the element is further protected by an insulating disk 16 having apertures to accommodate the leads 17 and 18 of the resistance coil, which in practice are connected to electric supply conductors not shown herein for reasons previously stated. The heatable instrumentality or tip consists of core portion 19 and tip portion 20, which are made from one piece of metal, preferably composed of a body of copper which has been subjected to surface treatment which will be described fully hereinafter. The tip is of the usual pointed form, whereas the core is cylindrical in shape and of a size to fit the interior of the heating element, which is retained fixedly in position upon the core in some suitable manner such as by sheet metal clamps 22. As an aid in securing the heating element within the housing, core 19 is provided with an external flange 23 near its outer end. This flange fits within an enlarged portion, or mouth, of the housing bore in abutting relation to shoulder 24. A retaining nut 25 is threaded into the housing mouth for clamping engagement with flange 24. It is to be understood that the novel feature of the structure shown in Fig. 1 is the one-piece heatable instrumentality and the permanent incorporation of the latter with the heating element in an assembly which requires unit replacement. As has already been explained, such a unitary structural organization has been impractical in the past because of the undesirability of being forced to replace a still serviceable heating element whenever a less durable tip has suffered functional break-down. The reference character C designates the composite coating which has been applied to the heatable instrumentality in accordance with my discovery which is about to be described. I shall now describe the invention or discovery which inhibits oxidation of copper tips and thereby increases the useful life thereof to an extent which makes it possible to realize the much desired unitary structure. It has been found that application of a coating, or plating, of iron to the external surface of a copper soldering iron tip very effectively inhibits oxidation. However, a coat of sufficient thickness impedes heat conduction at the tip surface to a serious degree. Furthermore, iron plating is difficult to tin and to keep tinned, thus causing the tip to resist adherence of solder. This failure of tinning, in turn, further slows down thermal conduction between the tip and the soldered joint. After exhaustive experimentation, I have made the discovery that application of an outer heat conducting layer or coating of silver on top of a primary coat of iron restores the surface conductivity of an iron plated tip of that of copper alone, because silver has higher heat conductivity than copper and the surface conductivity in a direction parallel to the axis of tip and core is very high.

Figure 2:
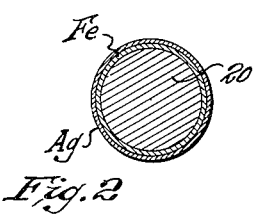
Fig. 2 is a cross-sectional view on a magnified scale of a soldering iron tip having a simplified bimetallic plating.

Fig. 2 shows the preliminary, simplified embodiment of the compound plating invention, wherein the copper body of the tip, or other heatable instrumentality, 20 has a primary plating coat Fe of iron and a secondary coat Ag of silver, it was found to be preferable to apply the successive coats by electroplating process for two principal reasons. In the first place, the bond between the iron coat and the copper body, and between the two platings, was more intimate and free from possibility of intermediate formation of undesirable alloys or other substances than would be the case in the employment of other processes, particularly those involving heating of the metals. Secondly, thickness can be controlled with greater precision. Although the thickness of each plating may be varied within limits consistent with the results sought, it has been found desirable to make the iron plating .012 inch in thickness and the silver plating one-sixth of that thickness, or .002 inch.

Figure 3:
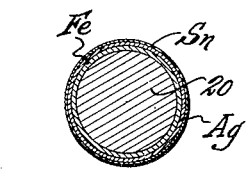
Fig. 3 is a similar view of a triple-plated tip.

The simple bimetallic compound plating just described may be employed without any changes, but further experimentation led to the discovery that application of a tertiary plating of tin to the surface of the silver coat had a remarkable effect upon surface conductivity. The silver and the tin also keep the tip so clean that the condition is like that of a brand new copper tip all through the greatly prolonged life thereof. It should be understood, too, that electrolytic deposition of a thin layer of tin on top of the silver coat is not to be confused with the customary "tinning" of a copper tip by rubbing the hot tip with solder immediately preceding each soldering operation. That sort of tinning is of a transitory nature, and the coating burns off under conditions of excessive heat. The tin coating contemplated by my invention is applied at room temperature and will adhere tenaciously and persistently to the silver surface. Fig. 3 shows a heatable instrumentality 20 which has been triple-plated by adding the coat Sn of tin to the primary and secondary coats Fe and Ag. It has been found desirable to apply the tin as a flash plating substantially .00001 inch in thickness.

Figure 4:
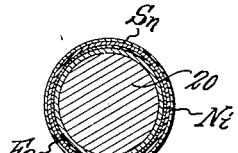
Fig. 4 is a similar view of a quadruple-plated tip.

In the use of silver for the secondary coat, failure of perfect adhesion between the iron and silver coats was found to occur in the case of tips which are subjected to high temperatures. After considerable experimentation, it was discovered that a flash plating of nickel applied to the iron coat before addition of the silver coat served to promote adhesion under all conditions of use. In Fig. 4, the nickel coat is designated by the reference character Ni. The quadruple-plating thus provided represents the preferred commercial product as it is now envisioned. It has been found, after thorough testing, that the compound-plated tip will retain its plating for from five hundred to one thousand hours of service, which is twenty to thirty times the life of an ordiary copper tip. All during the life of a compound-plated tip, a surface condition like new is maintained. Because of this uniform surface condition, the thermal conductivity is increased when compared to a copper tip. In other words, a copper tip at the end of ten hours of service loses as much as twenty percent of its thermal conductivity, whereas the compound-plated tip still has one hundred percent of its conductivity throughout its entire life. For soldering tips which are intended for use under conditions requiring temperatures in excess of 900° F., the nickel plating should be increased in thickness from the flash plating to one substantially .002 inch thick.

The foregoing results accomplished by compound-plating of copper in accordance with my invention have made it possible to utilize the one-piece core and tip structure disclosed in Fig. 1. By compound-plating the entire external surface of the one-piece heatable instrumentality, long life for the tip will be insured and also the heat conduction within the heating element between resistance coil and core will be increased. The latter condition, when coupled with the benefits of the elimination of any joint between core and tip, will effect the desired improved heat balance between heating element and tip. It is to be understood that the composite coating C in Fig. 1 may be either of the three types represented in Figs. 2 to 4.

Although the realization of a practical unitary heating element and heatable instrumentality organization has been emphasized herein, it is to be understood that the scope of the invention embraces the whole field of heatable instrumentalities, whether one-pice, multi-piece, solid in construction, or hollow. A need for separable tips may continue to exist, particularly in the smaller sizes. In such event, tips of that class may be improved in all essential qualities by taking advantage of my compound-plating. It is intended that the plating shall be extended to all surfaces, external and internal, depending upon whether the construction be of the solid types represented in Figs. 1 and 5 or hollow, as represented in Fig. 6. In this regard, the term "compound-plating" is intended to mean either the simplified, least expensive, bimetallic plating of Fig. 2, the complete moderate-temperature triple-plating of Fig. 3, or the complete high-temperature quadruple-plating of Fig. 4. Considerations of cost, technical conditions involved in the use of a particular type of implement, and other practical factors, will determine the particular plating selected and also the surface area to be coated.

Figure 5:
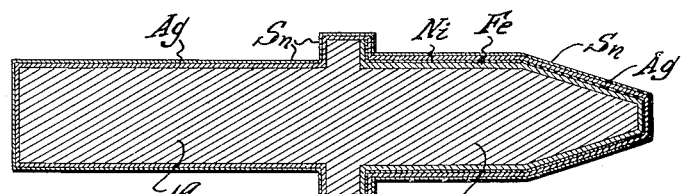
Fig. 5 is a longitudinal sectional view of a plug type tip having a modified endwise distribution of compound plating.
Figure 6:
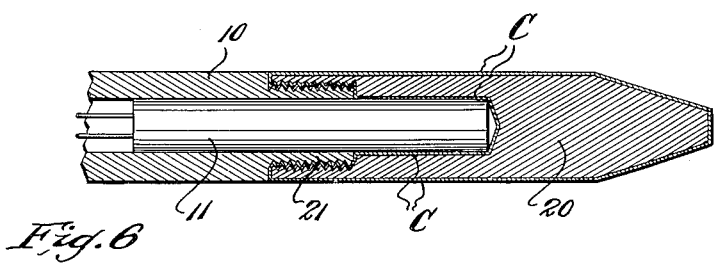
Fig. 6 is a longitudinal sectional view similar to Fig. 1 of a modified construction which includes a hollow tip with applied compound plating.

Concerning the surface area to be coated, Fig. 5 shows a possible variation from the continuity of a plating of a standard number of coats as represented in Figs. 2 and 4. In this example, the primary iron coat Fe has not been extended beyond the tip proper 20 of a plug type separable tip. The advantage of such a variation in treatment is to increase the conduction of heat between tip and core within the heating element. It is a compromise which may be justified in certain circumstances.

Fig. 6 illustrates a modified form of separable heating element and heatable instrumentality organization which will be benefited by compound-plating because of the resultant increase in thermal conduction between heating element and core. In this example, the tip 20 has a hollow shank 21 which is screwed onto the front end of housing 10. The heating element 11 used in this modified construction would be of the cartridge type which has a brass shell inclosing the resistance coil. The heating element fits inside the housing bore with sufficient clearance to afford heat insulating air space. The length of the element is such that one end projects into the hollow tip shank with only slight clearance. The brass shell of the element unites with the tip shank to constitute the heatable instrumentality of the implement. This type of soldering iron does not have the heat transmission efficiency of the type shown in Fig. 1 because of the two-piece tip and core structure, but it possesses the advantage that a tip of very large cross-section for work requiring maximum area of tip contact surface may be produced without enlarging the diameter of the iron housing. In such instances, the sacrifice of efficiency is justified by the other practical object in view. By comparing the tip in Fig. 1 with that in Fig. 6, it will be noted that the former is about half as large in diameter as the housing of the soldering iron, whereas the tip in Fig. 6 is fully as large as the housing.

Referring again to the inclusion of the plating in the triple-plated and quadruple-plated compositions shown in Figs. 3 and 4, it should be mentioned that this feature alone amounts to an improvement of vast importance. The saving in tip maintenance has been a surprising advantage of great appeal to industry. For instance, the usual and unavoidable maintenance of plain copper tips has consisted of repeated dressing, rubbing with oxidation-preventing agents, and re-tinning, every two hours under conditions of continuous use such as obtained in a factory. In order to perform this maintenance for any soldering iron, work must be suspended until the tip or the entire implement has been disconnected and replaced by substitute equipment. Such interruptions represent lowered work output and increased man-hours of labor. In addition, it ordinarily is necessary to employ a special group of tip maintenance workmen. Then, too, a tip which is subjected to maintenance of the nature outlined will last only a couple days before it must be discarded. Compare this situation of the past with the change produced by introduction of the permanent tin coating feature. One of the improved soldering iron tips need not be taken out of commission at any time during its entire life of from 500 to 1000 hours of service. The only maintenance required is occasional wiping with a damp cloth, which cannot be considered an interruption of work. The cost of special maintenance personnel has been eliminated. The other obvious advantages are of tremendous importance.

Because many changes could be made in the structure and metallic composition disclosed herein, and because widely different embodiments of the invention could be adopted without departing from the scope thereof, as defined in the following claims, it is intended that all matter contained in the above description or shown in the accompanying drawings shall be interpreted as illustrative and not in a limiting sense.

I claim:

1. In an electric soldering iron, a tip comprising a one-piece body of suitable form providing a tip portion and an elongated core portion rearwardly projecting from said tip portion, said body being composed of a metal possessing high heat conductivity such as copper and alloys thereof and having an oxidation inhibiting surface coating of iron, and an outer heat conducting layer of a metal possessing heat conductivity higher than that of the body metal encasing said body and its iron coating in heat conducting relation to the latter; and a heating element cooperating with said tip in a manner to effect an improved heat balance therebetween and comprising a resistance coil permanently affixed to the core portion of the tip in close concentric proximity to the outer heat conducting layer thereof, whereby one increment of heat generated by said resistance coil will be conducted radially through said heat conducting layer to the core portion of the body and thence axially through the latter to the tip portion, and whereby another increment of heat will be conducted axially through the outer heat conducting layer from the heating element directly to the working surface of the tip portion for addition to the first-mentioned heat increment to raise the temperature of said working surface to a degree permitting a reduction in the heat generating characteristics of the resistance coil of the heating element below those normal for a solid copper tip.

2. In an electric soldering iron as defined in claim 1, a tip wherein the outer heat conducting layer thereof is composed of silver.

ARTHUR L. JOHNSON.

REFERENCES CITED

The following references are of record in the file of this patent:

UNITED STATES PATENTS

| Number | Name | Date |
|---|---|---|
| 429,561 | Carpenter | June 3, 1890 |
| 1,350,181 | Remane | Aug. 17, 1920 |
| 1,667,618 | Abbott | Apr. 24, 1928 |
| 1,904,241 | Kammerer | Apr. 18, 1933 |
| 1,985,492 | Frohmuth et al. | Dec. 25, 1934 |
| 2,047,351 | Alexander | July 14, 1936 |
| 2,221,562 | Wernlund | Nov. 12, 1940 |
| 2,252,443 | Shipley | Apr. 12, 1941 |
| 2,324,802 | Powell | July 20, 1943 |
| 2,356,583 | Hampton | Aug. 22, 1944 |
| 2,469,878 | Hannon et al. | May 10, 1949 |
| 2,472,296 | Hartnell | June 7, 1949 |

FOREIGN PATENTS

| Number | Country | Date |
|---|---|---|
| 487,178 | Great Britain | June 16, 1938 |